L. M. LEVINE.
CHECK CONTROLLED APPARATUS.
APPLICATION FILED OCT. 5, 1914.

1,174,510.

Patented Mar. 7, 1916.
6 SHEETS—SHEET 1.

Fig. 1.

WITNESSES

INVENTOR

ATTORNEYS

THE COLUMBIA PLANOGRAPH CO., WASHINGTON, D. C.

L. M. LEVINE.
CHECK CONTROLLED APPARATUS.
APPLICATION FILED OCT. 5, 1914.

1,174,510.

Patented Mar. 7, 1916.
6 SHEETS—SHEET 2.

L. M. LEVINE.
CHECK CONTROLLED APPARATUS.
APPLICATION FILED OCT. 5, 1914.

1,174,510.

Patented Mar. 7, 1916.
6 SHEETS—SHEET 4.

WITNESSES

INVENTOR

ATTORNEYS

L. M. LEVINE.
CHECK CONTROLLED APPARATUS.
APPLICATION FILED OCT. 5, 1914.

1,174,510.

Patented Mar. 7, 1916.
6 SHEETS—SHEET 5.

UNITED STATES PATENT OFFICE.

LIONEL M. LEVINE, OF NEW YORK, N. Y.

CHECK-CONTROLLED APPARATUS.

1,174,510.  Specification of Letters Patent.  Patented Mar. 7, 1916.

Application filed October 5, 1914.  Serial No. 865,192.

*To all whom it may concern:*

Be it known that I, LIONEL M. LEVINE, a citizen of the United States, and residing in the borough of Manhattan, city, county, and State of New York, have invented certain new and useful Improvements in Check-Controlled Apparatus, of which the following is a full and clear specification.

The present invention relates to check controlled apparatus, and has for its primary object to provide improved means for testing checks or coins, eliminating bad or invalid checks or coins, and for utilizing the good or valid checks or coins to aid in the proper operation and control of any desired apparatus such for example as a vending machine.

One of the objects of this invention is to provide a hopper of improved construction which will positively prevent the introduction of a check or coin which is not of the correct form nor larger than a given size.

Another object is to provide improved means for testing checks or coins as to their composition, weight, resilience and size.

Another object is to provide improved means for returing a check or coin to a user of the machine in the event of the machine being out of order, empty or otherwise incapacitated.

Another object is to provide improved means for eliminating invalid checks or coins.

Another object is to provide improved means for restoring the several parts and mechanisms to normal position after each operation.

Other and further objects will appear in the specification and be pointed out in the appended claims, reference being had to the accompanying drawings, in which,—

Figures 5, 7, 10, 11, 16:
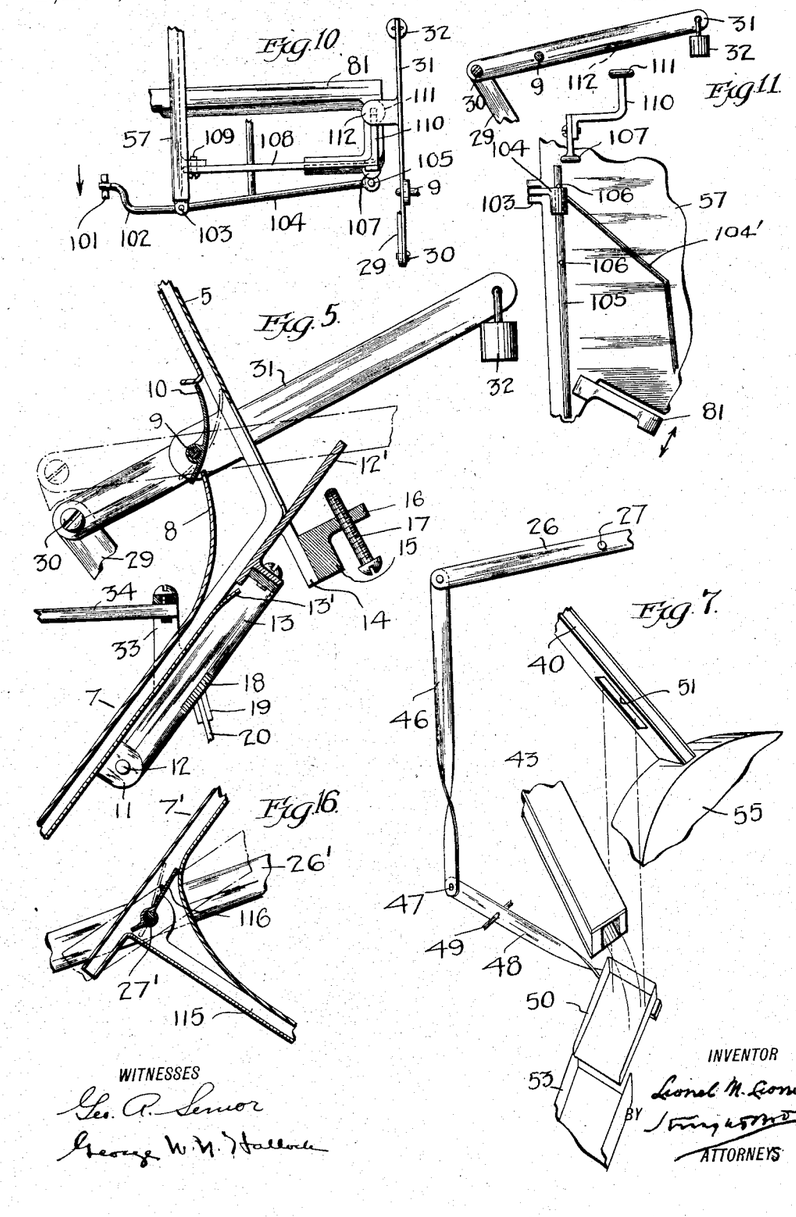
Fig. 5 is a fragmentary vertical section on an enlarged scale of one portion of the chute.
Fig. 7 is a fragmentary perspective view of contiguous portions of the chute, wheel, and reset mechanism.
Fig. 10 is a partial plan view of the coin or check chute reset locking mechanism, parts being broken away.
Fig. 11 is a fragmentary side elevation of the same.
Fig. 16 is a fragmentary section corresponding to Fig. 8, showing a modified construction.

In the embodiment of my invention shown on the drawings, a hopper 1 (see Fig. 1), preferably opens through the top wall 2 of the housing of the apparatus to be described. As shown in Fig. 2, said hopper converges toward a pocket 3, the oppositely disposed walls of which are separated a distance substantially equal to the thickness of the coin or check to be employed in the machine. These oppositely disposed walls are arranged substantially parallel and on an incline, the under wall of said pocket being provided with a circular opening 4 which corresponds exactly with the diameter of said coin or check, this construction being adapted to exclude all checks of greater thickness than the distance between said oppositely disposed walls, and also to exclude all checks of such a size and form as would occasion the corners thereof to project beyond the periphery of the circular opening. The opening 4 opens into the upper end of a section 5 of the chute (see Figs. 1 and 5). Adjacent the hopper 1 a magnet 6 is arranged above the upper wall of the section 5, its purpose being by means of its attractive power for iron and steel, to retard the movement of checks constructed of such metals to such a degree that their momentum will not be sufficient to operate a throwout gate or shutter to be presently referred to. Referring now to Fig. 5, it will be seen that the lower wall adjacent the lower end of said section has been removed, while the upper end of the corresponding wall of the section 7 of the chute has been displaced outwardly to form a curved sheet 8. Adjacent the upper edge of said sheet 8 is journaled a pintle 9 to which is keyed a curved gate or shutter 10 which normally occupies the full line position shown in Fig. 5, but after the passage of a valid check or coin, assumes the dotted line position shown in said figure. Mounted within oppositely disposed lugs 11 carried by the section 7 of the chute is a pin 12 upon which is journaled the branches 13 of a yoke. An upwardly projecting plate 12′ which surmounts the yoke 13, being rigidly secured thereto, constitutes a movable portion of the lower wall of the section 7 of the chute. An inspection of Fig. 5 of the drawings will show that the lower wall of said section terminates in an outwardly deflected flange 13′ at some distance below the corner between the sections 5 and 7, the remainder of the space being closed by the plate 12′. Depending portions 14 of the section 5 serve to mount a cross bar 15 with an outwardly projecting flange 16 within which is threaded a screw 17 which constitutes an adjustable abutment for limiting the downward displacement of the plate 12′. By an inspection of Figs. 5 and 6, it will be seen that the yoke 13 is provided with a cross bar 18. Integral with said cross bar 18 is a lug 19 to which is pivotally connected the upper end of a link 20, the lower end of said link being connected at 21 to one arm 22 of an angle lever which is pivoted at 23, the other arm 24 of which is formed as a hook which is adapted to engage a lug 25 projecting from a lever arm 26.

Figure 1:
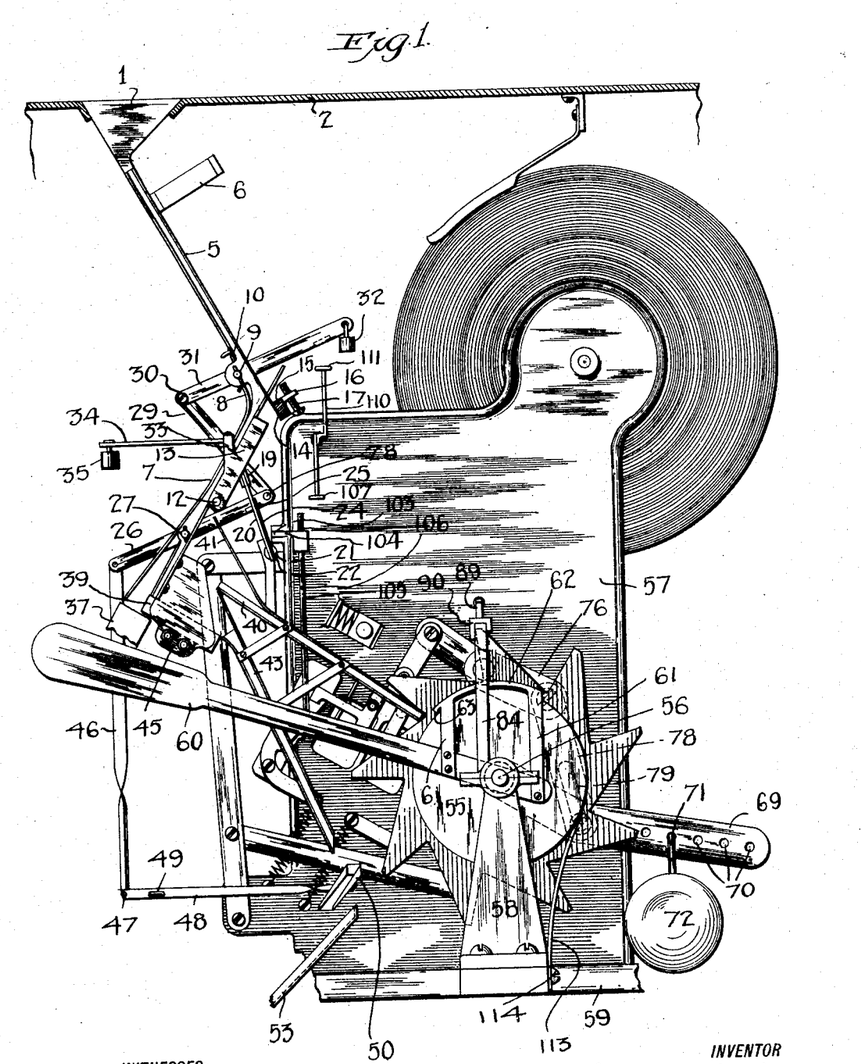
Figure 1 is a side elevation of a vending machine provided with my improvements.
Figure 2:
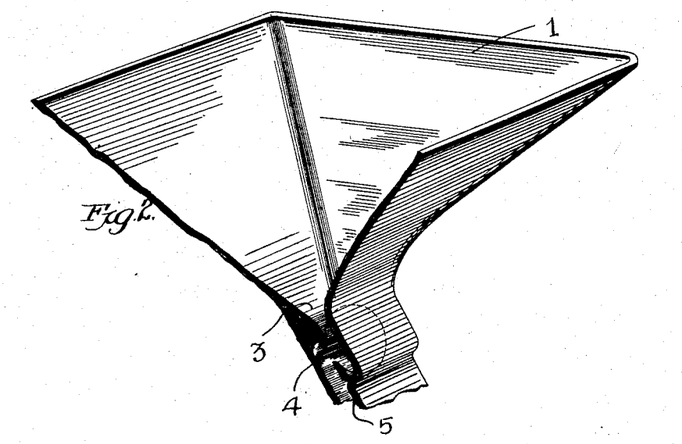
Fig. 2 is a fragmentary perspective view of the hopper surmounting the check or coin chute.
Figures 6, 8, 9:
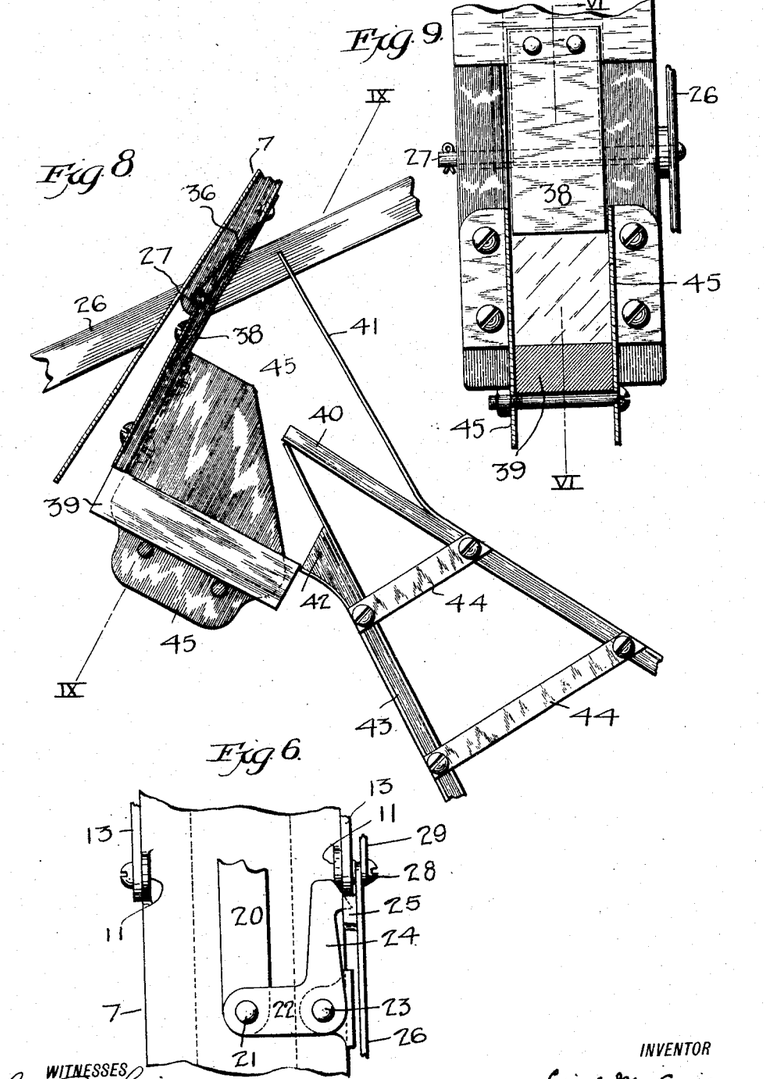
Fig. 6 is a fragmentary rear elevation of the same on an enlarged scale.
Fig. 8 is a similar fragmentary section of another part of the chute, taken on the line VI—VI, Fig. 9.
Fig. 9 is a fragmentary section on the line IX—IX, Fig. 8.

As shown in Fig. 1, the lever arm 26 is pivotally mounted in the section 7 of the chute by means of a pintle 27. The upper arm of said lever 26 is pivotally connected at 28 with the lower arm of a lever 29, the upper arm of said lever 29 being pivotally connected at 30 with the lever 31 which is keyed to the pintle 9 already referred to. On the upper arm of the lever 31, is suspended a weight 32 which tends to oscillate the lever 31 and throw the gate or shutter 10 into dotted line position, as shown in Fig. 5. It will be seen therefore that hook 24 which engages behind the lug 25 on the lever 26 prevents this action until such time as a check or coin of proper size, weight and material passes down the section 5 of the chute and impinges on the plate 12′. In order to counter-balance the yoke 13, so that it will not be too sensitive to the action of this impact, said yoke is provided with a frame 33 which carries a weight arm 34, a weight 35 being suspended from the outer end of said weight arm. Referring now to Figs. 8 and 9, it will be seen that the pintle 27 which carries the lever 26, also carries within the downwardly flared portion of section 7 of the chute, a gate or shutter 36 which normally occupies the position shown in Fig. 8. Should a light weight check or coin be dropped into the chute, or another which is not adapted to displace the yoke 13, it will pass over the gate 36 and downwardly into a chute 37 (see Fig. 1). On the other hand, in the event that a valid check or coin has been dropped into the chute, it will upon reaching the yoke 13, displace the plate 12′, thus causing the release of the lever 31, which will occasion an oscillation of the lever 26 to throw the gate 36 into its uppermost position. Immediately thereafter, the check or coin passes into the lower passage of section 7 of the chute, displacing on its way, the spring partition 38 (see Fig. 8) which constitutes a movable portion of the lower wall of the chute at this point to direct the check or coin edgewise upon a resilient block 39 which is suitably mounted at the lower end of the lower run of section 7 of the chute to test the resilience of a check or coin. By this means the chute is provided with a lower wall that extends near to the block 39 but which at the same time springs out of the path of the check or coin on its rebound. Below the partition 38, the lower wall of said lower run of the chute is removed. Supposing the check or coin which has produced this operation of the parts, is of the required degree of resiliency, it will rebound sufficiently high to drop into a chute 40 with its upper end disposed as shown in Fig. 8. The upper wall of the chute 40 has its upper end 41 deflected upwardly to intercept the check or coin on its re-bound. Should, on the other hand, said check or coin be invalid by reason of its lack of resiliency, say for example, a lead disk, said lead disk will slide down the block 39 and into the flared opening 42 of a chute 43. Chutes 40 and 43 are preferably connected by suitable tie bars 44. Extending substantially across the openings between the lower end of the chute section 7 and the upper ends of the chute sections 40 and 43 are plates 45. Referring now to Fig. 1, it will be seen that a link 46 has its upper end pivotally connected to the lever 26, the lower end of said link being connected at 47 to one arm of a lever 48 provided with trunnions 49 by means of which it is fulcrumed in any suitable support (not shown on the drawings). As shown in Figs. 1 and 7, the lever 48 carries a pan 50 which is disposed below the lower end of the chute section 43, so that in the event that checks or coins of insufficient resiliency have caused the gate or shutter 10 to be thrown into dotted line position shown in Fig. 5, said check or coin upon reaching the pan 50 will cause a return movement of said gate or shutter into full line position, the weight 35 carried by the yoke 11 acting at the same time to throw the hook 24 into engagement with the lug 25, thus retaining the gate or shutter 10 in normal position until the next operation of the apparatus.

Figure 4:
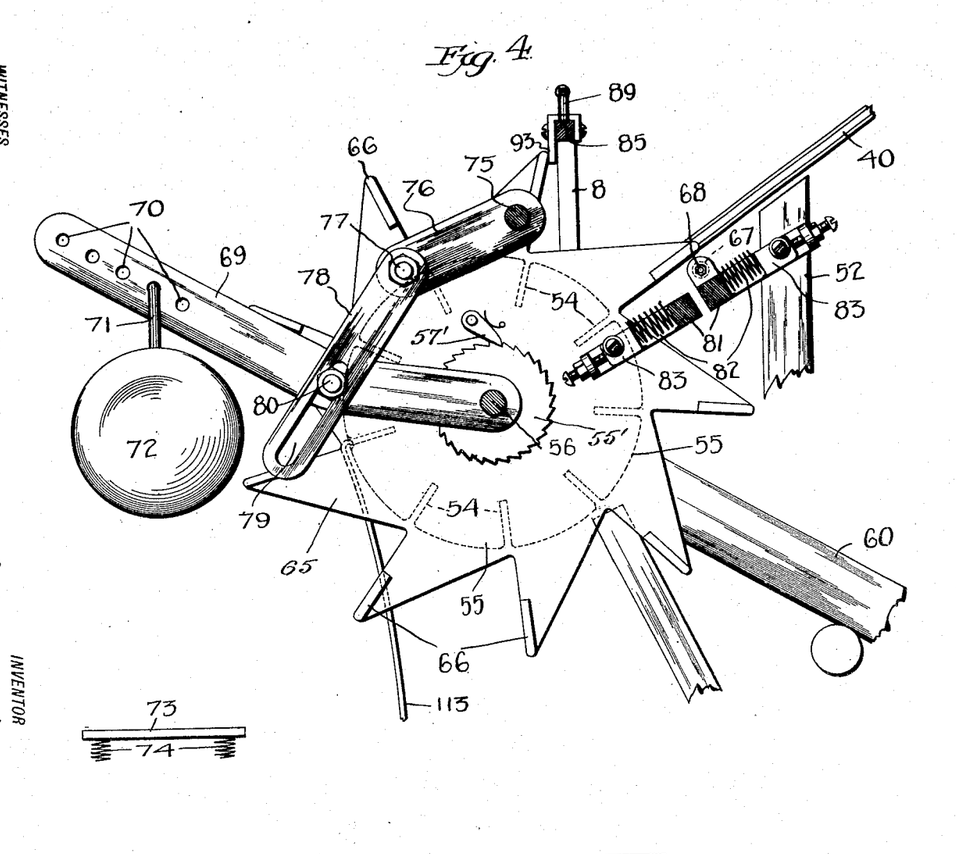
Fig. 4 is a vertical section of the machine, taken from the opposite side of the check or coin wheel from that shown in Fig. 1.

As shown in Fig. 7, the chute section 40 for valid checks or coins is provided with a slot 51 in its lower wall, said slot being of slightly less width than the diameter of the valid check or coin, so that if such a check or coin, proper in every other respect, be slightly too small in diameter, should pass down the chute 40, it would fall through the slot 51 into the upper end of a chute 52 (see Fig. 4). Said chute is not shown in Fig. 7, but its location is indicated by dot and dash lines for the sake of clearness. The lower end of chute 52 discharges into the pan 50 and thence into the upper end of a chute 53 which conveys it to any desired point.

Figure 3:
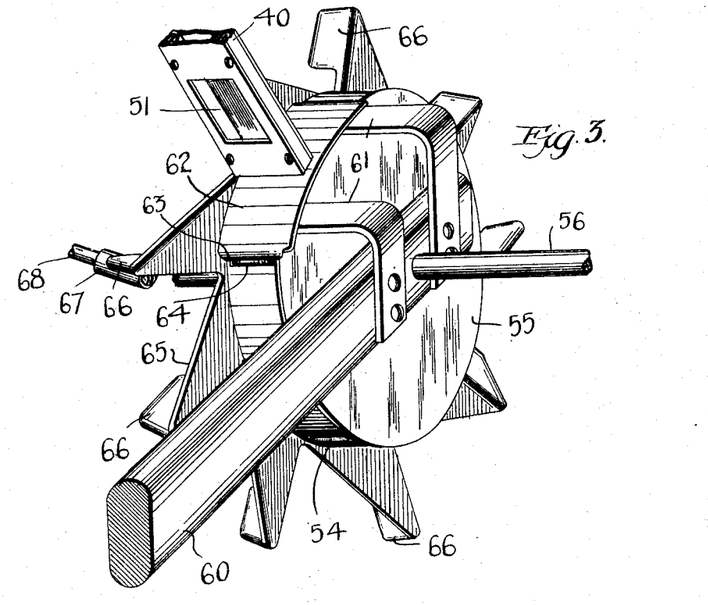
Fig. 3 is a perspective detailed view showing the check receiving wheel and a check or coin in one of the slots therein, illustrating the method of utilizing the presence of a check or coin in operating the machine.

Referring more especially to Figs. 3 and 4, it will be noted that the chute section 40 is suitably disposed to deliver checks or coins into the radial slots 54 of a wheel 55, said wheel being freely journaled upon a shaft 56. Said shaft 56 may be rotatably mounted in any suitable manner, preferably having one end journaled in the side wall 57 of the ticket vending machine shown in Fig. 1, and its other end journaled in a pedestal 58 which is rigidly mounted on the base plate 59. Secured to the plate 65 of the wheel 55 as shown in Fig. 4, is a ratchet 55' which coöperates with a spring-pressed pawl 57' to prevent a reverse movement of the wheel, said pawl being journaled upon a rod which is rigid with the side frame 57. Keyed to the shaft 56 as shown in Figs. 1 and 3, is an operating lever 60 which as shown best in Fig. 3, carries a pair of bracket arms 61 which are rigidly secured thereto and which are provided with bent ends overhanging the periphery of the wheel 55. Secured to said overhanging ends is an arcuate plate or shield 62, the forward edge of which being preferably provided with an inwardly deflected lip 63 which is adapted to impinge upon a check or coin 64 shown in Fig. 3, which has previously been deposited into one of the slots 54 out of the chute 40. In the position of the parts shown in Fig. 3, the operating lever 60 has been depressed, thus oscillating the shield 62 forwardly into a position in which it closes the lower end of the chute 40, so that if other checks or coins have been deposited into the hopper at the top of the machine, they will be retained in the chute 40 until the shield 62 has been returned to normal position shown in Fig. 1 when the next check or coin will be free to enter the next slot preparatory to another operation of the machine. Secured to the inner lateral face of the wheel 55 is a sheet metal plate 65, said plate being preferably in the form of a many pointed star and each point of the star being provided with a laterally projecting flange or lug 66. Each of said flanges is adapted in its turn to engage any desired instrumentality such as the cam roller 67 carried by a pin 68. It will be understood, however, that the cam roller 67 can be carried by any desired machine which is to be rendered automatically operative by means of a coin or check deposited in the manner referred to. As shown in Fig. 4, a bent lever arm 69 is keyed to the shaft 56, the outer end of said arm being provided with a plurality of holes 70, any one of which is adapted to receive the hook 71 by which a weight 72 is suspended at any desired point along the lever arm 69. Normally said weight 72 retains the operating lever 60 in raised position as shown in Fig. 1. Suitable means for cushioning the descent of the weight 72 may be provided by a table 73 mounted on yieldable supports such as the springs 74. As shown best in Fig. 4, a shaft 75 which is preferably the power transmitting shaft of the ticket vending machine shown in Fig. 1, has keyed thereto an arm 76. The outer end of the arm 76 carries a pin or bolt 77 upon which is journaled a link 78 provided with a slot 79 in its lower end which slidably incloses a pin or bolt 80 carried by the weight arm 69. The purpose of this slotted arm connection is to permit the up and down movement of the operating lever 60 without imparting movement to the shaft 75 in the event of no coin or check being deposited in the chute. This prevents breakage or strain on the machine due to mischievous manipulation.

Figures 12, 13, 14, 15:
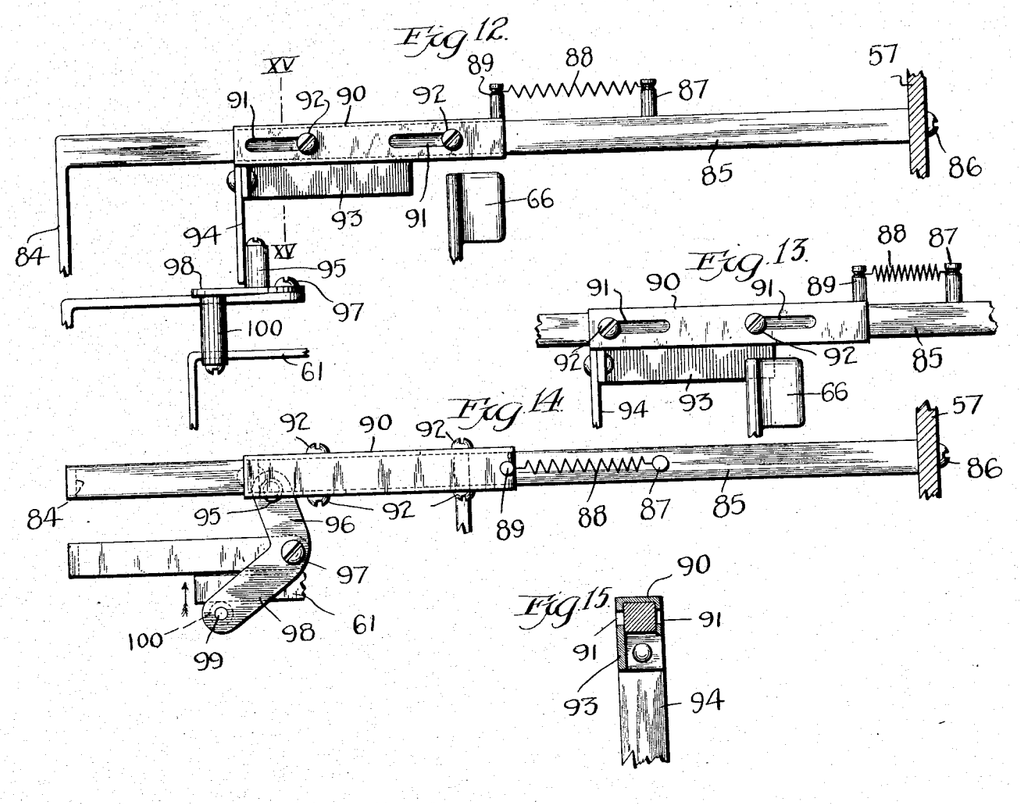
Fig. 12 is a rear elevation of the stop mechanism for preventing an excess forward movement of the coin or check wheel, parts being broken away.
Fig. 13 is a similar view showing the parts in position to block an excess forward movement.
Fig. 14 is a top plan view corresponding to Fig. 12.
Fig. 15 is a detailed section on the line XV—XV, Fig. 12.

Referring now to Figs. 1 and 12 to 15 inclusive, an angle bracket is provided having a vertical arm 84 carried by the standard 58, as shown in Fig. 1, and a horizontal arm 85 secured to the side wall 57 by means of a screw 86 as shown in Figs. 12 and 14. A post 87 mounted on the horizontal arm 85 has one end of a spring 88 attached thereto, the other end of said spring being attached to a post 89 mounted on a slide 90, said slide being reciprocably mounted on the arm 85 and having longitudinal slots 91 through which extend the screws 92 which retain it in place on the arm 85. An integral flange 93 depends from the slide 90, being normally held in the position shown in Fig. 12 against the tension of spring 88 by means of a depending arm 94 which is engaged by a roller 95 carried by one arm 96 of an angle lever pivoted on the screw 97, the other arm 98 of said lever being provided with a pin 99 upon which is journaled a roller 100, which is normally engaged by the rearmost bracket 61 which supports the shield 62 from the operating lever 60. It will be seen therefore that when the operating lever is in normally raised position, the bracket 61 retains the slide 90 in the position shown in Figs. 12 and 14. When, however, a valid check or coin has been deposited within the wheel and the downward movement of the lever 60 produces a forward movement of the wheel 55, the arm 61 withdraws from the roller 100 and permits the spring 88 to retract the slide 90 into the position shown in Fig. 13 in which the depending flange 93 is disposed in the path of the next succeeding flange or lug 66, thus preventing an excess forward movement of the wheel 55.

Referring now to Figs. 1, 5, 10 and 11, suitable and efficient means for automatically controlling the reset for the gate or shutter 10 is provided as follows: In Fig. 10 is indicated the upper end 101 of a lever arm which is moved forwardly in the direction of the arrow after each operation. During this movement of the lever 101, one arm 102 of a lever which is pivoted at 103 in the wall 57 is moved forwardly, thus throwing rearwardly the other arm 104. An inspection of Fig. 11 will show that the arm 104 carries a vertical rod 105, said rod being provided with spaced pins 106 for limiting the vertical movement thereof under the action of one of the puller arms 81, which oscillates in the direction of the double pointed arrow shown in Fig. 11. Thus, if the lever 101 has moved forwardly, the rod 105 will be thrown into position to be engaged by the puller arm 81 on its next upward movement, this disposition of the rod 105 being made when the puller arm 81 is in its lower position. In consequence the rod 105 will be displaced upwardly to engage the pad 107 depending from the outer end of an arm 108 which, as shown in Fig. 10, is pivotally mounted at 109 on the side frame 57. A bracket 110 carried by the outer end of the arm 108 is surmounted by a pad 111 which on the upward movement of the rod 105 is forced into engagement with a lug or projection 112 carried by the lever arm 31, so that the weight 32 will be raised and the gate or shutter 10 moved into full line position shown in Fig. 5. Simple and efficient means for returning the lever 104 to its former position, may be provided by a rod 104' carried by the sleeve on the outer end of lever arm 104, the lower end of said rod being suitably disposed to be moved toward the left according to Fig. 11, by a gripping arm which is not shown but which moves toward the left to coöperate with the arm 81 at the end of the upward movement of the puller shown, described and claimed in my co-pending application above referred to. As pointed out hereinbefore, the yoke 13 is at the same time raised, causing the trigger mechanism shown in Fig. 6, to retain the lever 26 in corresponding position. As shown in Figs. 1 and 4, a detent for retaining the wheel 55 in any position in which one of the slots 54 is in register with the lower end of the chute 40, may be provided by a leaf spring 113 with its lower end secured by a screw 114 to the base plate 59.

In the modification shown in Fig. 16, the resilient pad is omitted from this part of the chute and instead placed at some other part of the chute. According to Fig. 16, the chute section 7' is connected directly to the upper end of a lower chute section 115, the section 7' being continued downwardly beyond the joint to convey off the checks or coins eliminated by a gate or shutter 116 which is carried by a pintle 27' to which is keyed the lever arm 26'. The lever arm 26' and the gate or shutter 116 are subject to the same conditions and method of operation as the corresponding parts shown in Figs. 1 and 8.

Obviously various modification in the construction arrangement of parts can be embodied in the machine as described, without departing from the broad spirit of my invention.

I claim:

1. In a vending machine, a coin or check chute having a hopper provided with a pocket, said pocket having an inclined wall over which the check or coin slides by gravity, a ledge for blocking the edgewise movement of a coin or check, said inclined wall being provided with an opening into the main body of said chute corresponding exactly in contour with the periphery of said check or coin, said pocket being arranged on an incline with said lateral opening in the lower wall thereof.

2. In a vending machine, a check or coin chute comprising an upper inclined section having an opening in its lower wall and a passageway above its upper wall, a resilient pad or block arranged transversely to said chute and below the upper end of said opening, and another section of said chute with its upper end spaced from the opening in the lower wall of said upper section to permit checks or coins having insufficient resilience to drop out of said chute, and a throw-out gate or shutter suitably arranged and adapted to be operated by the momentum of a falling check or coin to control said passageway.

3. In a vending machine, a check or coin chute comprising an upper inclined section having an opening in its lower wall and a passageway above its upper wall, a resilient pad or block arranged transversely to said chute and below the upper end of said opening, and another section of said chute with its upper end spaced from the opening in the lower wall of said upper section to permit checks or coins having insufficient resilience to drop out of said chute, and a throw-out gate or shutter suitably arranged and adapted to be operated by the momentum of a falling check or coin to control cam rollers being adapted to be engaged by a part rigid with said lever.

21. In a machine of the character described, an instrumentality to be repeatedly operated, means adapted by the aid of a check or coin to operate said instrumentality, a check or coin chute provided with a cut-out for returning a check or coin deposited therein, check or coin operated means for operating said cut-out, means for resetting said cut-out after each operation, and means for locking said resetting means.

22. In a machine of the character described, an instrumentality to be repeatedly operated, means adapted by the aid of a check or coin to operate said instrumentality, a check or coin chute provided with a cut-out for returning a check or coin deposited therein, check or coin operated means for operating said cut-out, means for resetting said cut-out after each operation, and means for locking said resetting means, said reset means including a reciprocatory rod movable into and out of the path of said instrumentality.

23. In a machine of the character described, an instrumentality to be repeatedly operated, means adapted by the aid of a check or coin to operate said instrumentality, a check or coin chute provided with a cut-out for returning a check or coin deposited therein, check or coin operated means for operating said cut-out, means for resetting said cut-out including a lever, a reciprocatory rod movable into and out of position to transmit an impulse from said instrumentality to said lever, and means adapted to be operated periodically for shifting the position of said rod.

24. In apparatus of the character described, a chute for checks or coins, comprising spaced sections, and a resilient block disposed transversely to one of said sections, said section having an inclined lower wall, a portion of said inclined wall being removed to permit a check or coin to rebound from said resilient block into the other section of said chute, another portion of said inclined wall above the opening being normally arranged across said section, said other portion being yieldable to permit the passage of a check or coin and to adapt it to return into normal position after the passage of said check or coin.

25. In check-operated apparatus, an inclined upper chute section having an opening in its lower wall, a resilient block arranged transversely of said section adjacent the lower end of said opening, another chute section having a portion adapted to receive checks or coins as they rebound from said block, said portion of the other chute section being suitably spaced therefrom to trap checks or coins of insufficient resilience, and yieldable means arranged above said opening for pressing the checks or coins against the upper wall of the first said section.

26. In check-operated apparatus, an inclined upper chute section with an opening in its lower wall, a resilient block arranged transversely of said section adjacent the lower end of said opening, another chute section having a portion adapted to receive checks or coins as they rebound from said block, said portion of the other chute section being suitably spaced therefrom to trap checks or coins of insufficient resilience, and means arranged above said opening for yieldably pressing the checks or coins against the upper wall of the first said section, said means comprising a movable portion of the bottom wall of said chute section.

27. In a check controlled apparatus, a chute provided with an opening in one wall, said chute being provided with a resilient portion adjacent said opening which is normally displaced against the opposite wall of said chute, and a resilient block extending across said chute below said openings, said resilient portion being adapted to permit the passage of a check or coin and to fly back into position to form a guide for the check or coin on its rebound from said resilient block.

LIONEL M. LEVINE.

Witnesses:
ARTHUR L. RICE,
GEORGE W. N. HALLOCK.